Oct. 24, 1950      F. G. GRAVES      2,527,214

COMPOST TANK

Filed Sept. 1, 1948

F. G. Graves
INVENTOR

BY C. A. Snow & Co.
ATTORNEYS.

Patented Oct. 24, 1950

2,527,214

UNITED STATES PATENT OFFICE 2,527,214

COMPOST TANK

Forrest Glenn Graves, Glendale, Calif.

Application September 1, 1948, Serial No. 47,227

1 Claim. (Cl. 119—15)

This invention relates to a tank or container designed for containing earth worms used in fishing, the primary object of the invention being to provide a container in which certain compost material is placed providing food and living conditions for worms to permit the worms to multiply and grow.

An important object of the invention is to provide a tank or container which is so constructed that the worms may be removed by removing the lower layers of compost through the bottom of the container, thereby eliminating the necessity of disturbing the worms and layers of compost in the upper part of the container.

Still another object of the invention is to provide a container or tank which may be supplied with compost and worms and maintained in confined areas such as the back yard.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
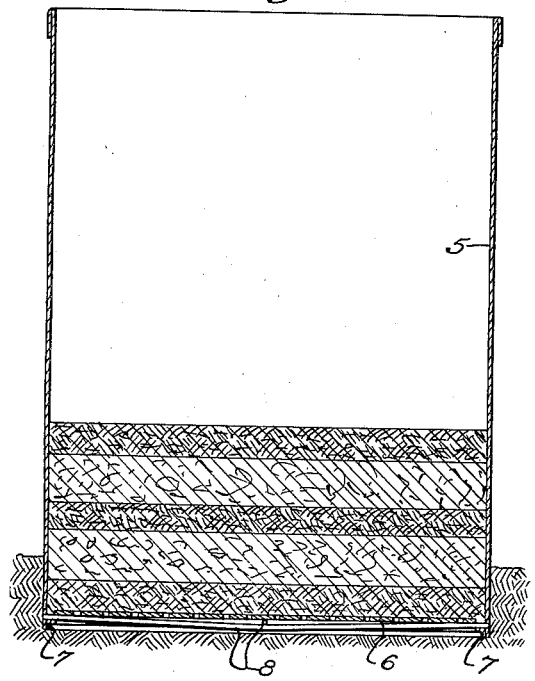
Figure 1 is a vertical sectional view through a tank or container, constructed in accordance with the invention and containing compost material.
Figure 3:
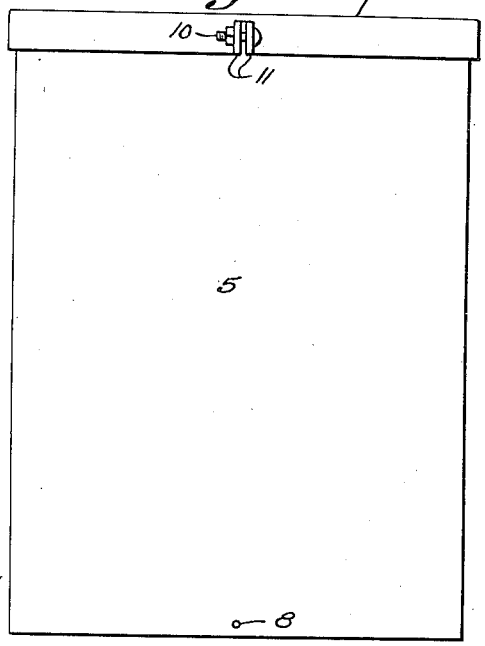
Fig. 3 is a side elevational view of the container.
Figure 2:
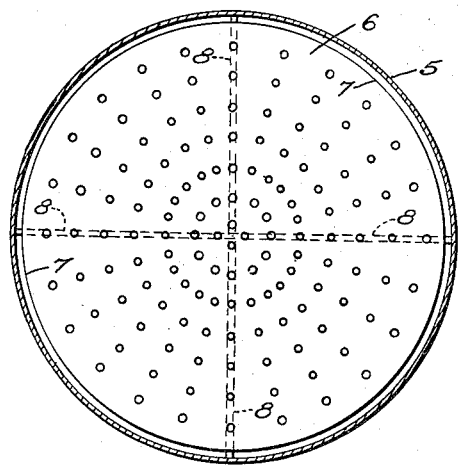
Fig. 2 is a transverse sectional view through the container.
Figure 4:
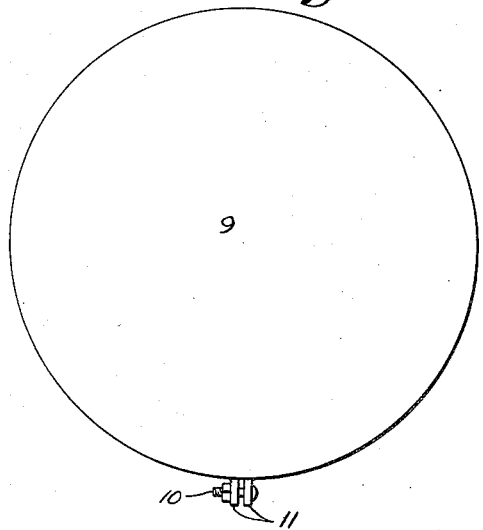
Fig. 4 is a top plan view thereof.

Referring to the drawing in detail, the device comprises a tank constructed preferably of metal, the tank being indicated generally by the reference character 5.

The reference character 6 indicates the disc-like bottom of the tank which as shown, is perforated to allow moisture to drain from the tank.

The construction of the bottom of the tank is such as to provide an inwardly extended annular flange 7 which is spaced from the lower edge of the tank, as clearly shown by Fig. 1 of the drawing, the body portion having openings formed therein at points adjacent to the upper surface of the flange 7, in which the supporting rods 8 are positioned, the supporting rods 8 crossing each other at points at the center of the disc-like bottom 6. These rods provide a support for the bottom and permit the support to be readily and easily removed, when the tank is turned on its side for removal of the contents thereof.

In use, the tank is positioned upright, and the lower end or bottom thereof is positioned in a hole dug in the earth so that the bottom of the tank will be about four inches below the surface. The tank is filled with compost formed preferably in layers, the bottom layer being a mixture of dirt and manure of equal parts. The bottom layer of dirt and manure is now moistened and the worms which may be of any desirable type for fishing bait, are placed on the lowermost layer of compost. To this layer is added a layer embodying approximately five gallons of kitchen garbage. The tank is then filled to the desired height by applying alternate layers of dirt and garbage.

The cover which is indicated by the reference character 9 is positioned on the top of the tank or container and is secured tightly in place by means of the securing bolt 10 that passes through the ears 11 extending laterally from the side of the cover where the cover is split, to permit the cover to expand and contract over the upper edge of the container.

When it is desired to remove worms from the compost, it is only necessary to tilt the tank over so that it rests on its side. The rods 8 may now be removed and the bottom 6 removed, so that access to the compost and worms to be removed may be readily had through the bottom. In this way, the upper layers of compost will be retained intact and need not be disturbed when removing the worms.

From the foregoing it will be seen that due to the construction shown and described, a person may install a tank of this character in a restricted area such as the back yard and possess an ample supply of worms which may be used as fishing bait.

Having thus described the invention, what is claimed is:

A compost containing tank comprising a cylindrical body portion having an open bottom, an annular flange extending inwardly from the bottom providing an internal annular shoulder, rods extending across the open bottom, said rods extending at right angles with respect to each other and contacting each other at their points of crossing, the ends of the rods resting on the annular shoulder, a removable perforated disc-like bottom member in the body portion resting on the rods, the removable bottom member being substantially smaller in diameter than the diameter of the cylindrical body portion providing a space between the edge of the bottom and wall of the body portion, said body portion having openings in which the ends of said rods extend, and a cover secured at one end of the body, closing the body.

FORREST GLENN GRAVES.

REFERENCES CITED

The following references are of record in the file of this patent:

UNITED STATES PATENTS

| Number | Name | Date |
|---|---|---|
| 1,226,993 | Perkins | May 22, 1917 |
| 1,307,608 | Woodward | June 24, 1919 |
| 1,576,289 | Ledden | Mar. 9, 1926 |

FOREIGN PATENTS

| Number | Country | Date |
|---|---|---|
| 20,184 | Great Britain | Sept. 10, 1907 |